US006746323B1

United States Patent
Digby, Jr.

(10) Patent No.: US 6,746,323 B1
(45) Date of Patent: Jun. 8, 2004

(54) AIRFLOW SYSTEM FOR MAINTAINING CONSTANT TEMPERATURE INSIDE A LEAD TRAILER AND ATTACHED PUP TRAILER

(75) Inventor: Don Digby, Jr., Commerce City, CO (US)

(73) Assignee: Navajo Express Inc., Commerce City, CO (US)

( * ) Notice: Subject to any disclaimer, the term of this patent is extended or adjusted under 35 U.S.C. 154(b) by 0 days.

(21) Appl. No.: 10/611,538

(22) Filed: Jul. 1, 2003

(51) Int. Cl.$^7$ ................................................ B60P 3/20
(52) U.S. Cl. .......................... 454/91; 62/237; 454/119; 454/903
(58) Field of Search .............................. 454/90, 91, 118, 454/119, 903; 62/237

(56) References Cited

U.S. PATENT DOCUMENTS

| | | | | |
|---|---|---|---|---|
| 850,158 A | * | 4/1907 | Hill | 454/108 |
| 2,293,360 A | * | 8/1942 | Reilly et al. | 454/91 |
| 3,211,076 A | * | 10/1965 | Chancellor et al. | 454/156 |
| 4,172,494 A | * | 10/1979 | Saulters | 165/43 |
| 4,477,099 A | * | 10/1984 | Luyckx | 280/421 |
| 4,901,538 A | * | 2/1990 | Anthony | 62/237 |
| 4,934,255 A | * | 6/1990 | McDonnell et al. | 454/174 |

\* cited by examiner

Primary Examiner—Harold Joyce
(74) Attorney, Agent, or Firm—Edwin H. Crabtree; Ramon L. Pizawo; Donald W. Margolis

(57) ABSTRACT

An airflow system adapted for receiving airflow from a refrigeration unit mounted on a front of a lead trailer. The airflow system is also adapted for transferring and receiving airflow from a pup trailer pulled behind the lead trailer. The airflow system uses heated or cooled airflow discharged from the refrigeration unit inside the lead trailer to heat or cool goods at a constant temperature stored inside both of the trailers. The airflow system includes a modified air chute attached to the refrigeration unit and a lead airflow transfer hole in a rear door of the lead trailer. A transfer tube is connected to the transfer hole and to a pup airflow intake hole in the front of the pup trailer for circulating the airflow through the pup trailer. A return tube is connected to a pup airflow return hole in the front of the pup trailer and a lead airflow return hole in the lead trailer's rear door. The return tube returning airflow from the pup trailer to the lead trailer for circulating the airflow through the lead trailer and recirculating the airflow back to the refrigeration unit.

15 Claims, 3 Drawing Sheets

AIRFLOW SYSTEM FOR MAINTAINING CONSTANT TEMPERATURE INSIDE A LEAD TRAILER AND ATTACHED PUP TRAILER

BACKGROUND OF THE INVENTION (a) Field of the Invention

This invention relates broadly to the cooling and heating of the inside of a highway transport trailer and more particularly, but not by way of limitation, to an airflow system and method for maintaining a constant temperature inside both a lead or front trailer and inside an attached "pup" or rear trailer. The airflow system using a single refrigeration unit mounted on the front of the lead trailer.

(b) Discussion of Prior Art

Heretofore, there have been a variety of different types of cooling systems and refrigeration units used with highway transport trucks and trailers and railroad cars when transporting perishable fruits, vegetables and other items. In U.S. Pat. No. 2,303,867 to Stebbins, an early method of refrigerating railroad cars and commercial trucks is disclosed. A cooling unit is attached to a side of a railroad car or a truck and cold air is circulated around and past perishable vegetables. In U.S. Pat. No. 2,937,510 to Allyne, an apparatus for controlling temperature inside a trailer is described. The trailer includes a refrigeration unit adapted to contain Dry Ice. Using a fan, air is drawn upwardly from a cargo space and through an air-cooling space and back over the top of the cargo. In U.S. Pat. No. 4,934,255 to McDonnell et al., a food treating apparatus and method for ripening fruit without having to remove the fruit from a truck or trailer is illustrated. A fruit ripening unit with air circulating system is parked next to a rear of three trucks for circulating air at a controlled temperature into the trucks with stored fruit. In U.S. Pat. No. 3,972,674 to Harrell, a crop drying apparatus is disclosed for drying tobacco, peanuts and grain hung inside a trailer.

None of the above mentioned prior art patents specifically disclose the unique features, structure and function of the subject airflow system used with a lead trailer with a refrigeration unit and attached pup trailer for maintaining a constant temperature inside both of the trailers and using the same refrigeration unit.

SUMMARY OF THE INVENTION

In view of the foregoing, it is a primary objective of the subject airflow system to provide a constant temperature to goods and products being transported inside a lead trailer with refrigeration unit and inside a pup trailer and using only a single refrigeration unit for cooling or heating the two trailers. For example, during the transporting of beer, the airflow system maintains the temperature of the stored beer at 40 degrees F. in both front and rear trailers. Also, depending on the heating and cooling capacity of the refrigeration unit, the two trailers can be heated and cooled at a constant temperature in a range of 35 to 60 degrees F. The two trailers are used for carrying various types of goods and products that require a constant temperature when being transported.

Another object of the invention is the subject airflow system can be used with both a standard 48 foot or 53 foot lead trailer with refrigeration unit and with an attached 28 foot or 32 foot pup trailer. The combination of the lead and pup trailers provide for increased payloads of the goods being shipped, less transportation cost and less maintenance cost.

Still another object of the airflow system is it can be quickly disconnected from the lead and pup trailers so that each trailer can be used independently of each other when the new airflow system is not required.

Yet another object of the invention is the airflow system can be retrofitted for different lengths of lead trailers and pup trailers, when the overall length of the two units is approved by state and federal law.

The airflow system is adapted for attaching to a refrigeration unit mounted on a front of a lead trailer and adapted for attaching to a pup trailer pulled behind the lead trailer. The airflow system uses the heated or cooled airflow discharged from the refrigeration unit to either heat or cool goods at a constant temperature. The goods are stored inside the lead trailer and the pup trailer. The airflow system conveys the airflow along the length and the top of both the lead trailer and the pup trailer. The airflow is then redirected back along the length and the bottom of both the pup trailer and the lead trailer heating and cooling the goods at a constant temperature. The return airflow is then drawn into the refrigeration unit and recirculated.

The airflow system includes a modified air chute having a first end adapted for attaching to an air discharge opening in the refrigeration unit. A second end of the air chute is attached to a rear door air manifold. The air manifold is mounted on an upper portion of one of the lead trailer's rear doors. The rear door manifold is disposed around a lead airflow transfer hole in the rear door. The transfer hole is connected to one end of a transfer tube. An opposite end of the transfer tube in connected to a pup airflow intake hole. The intake hole is in an upper portion of the front of the pup trailer.

The airflow, received from the lead trailer, is circulated along the length and the top of the pup trailer where it engages the pup's rear door. The airflow is then redirected back along the bottom and floor of the pup trailer before returning through a pup airflow return hole. The return hole is in a lower portion of the front of the pup trailer. The return hole is connected on one end of a return tube. An opposite end of the return tube is connected to a lead airflow return hole. The lead airflow return hole is in a lower portion of the lead trailer's rear door. The airflow is discharged along the bottom and floor of the lead trailer before being received in an air return opening in the refrigeration unit.

These and other objects of the present invention will become apparent to those familiar with various types of refrigeration units used for heating and cooling products transported by trailers when reviewing the following detailed description, showing novel construction, structure, function and method steps as described herein, and more particularly defined by the claims, it being understood that changes in the various embodiments to the invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which.

DETAILED DESCRIPTION OF THE PREFERRED EMBODIMENTS

Figure 1:
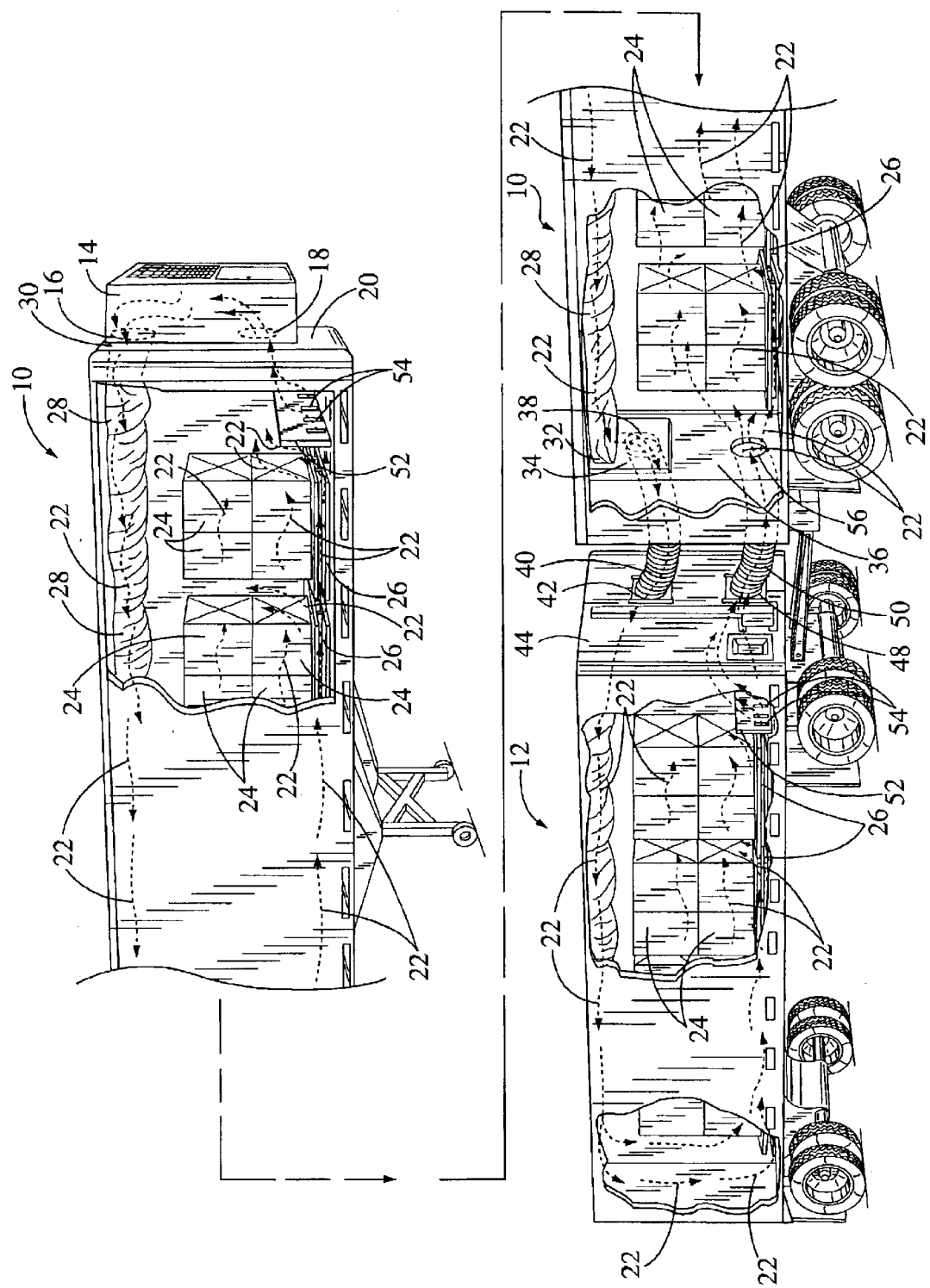
FIG. 1 is a perspective view of a lead trailer with a refrigeration unit and an attached pup trailer. A portion of the sides of the two trailers has been cutaway to show goods stored on pallets inside the trailers. The circulation of the airflow is shown in arrows for heating or cooling the product at a constant temperature.

In FIG. 1, a perspective view of a lead trailer and an attached pup trailer are shown. The lead trailer has a general reference numeral 10 and the pup trailer has a general reference numeral 12. A refrigeration unit 14 with an air discharge opening 16 and an air return opening 18 is mounted on a front 20 of the lead trailer 10. As mentioned above, the lead trailer 10 can have a standard length of 48 feet or 53 feet and the pup trailer 12 can have a length of 28 feet or 32 feet. Obviously, the two trailers 10 and 12 can have various lengths using the subject airflow system without departing from the spirit and scope of the invention as described herein. The airflow system uses heated or cooled airflow, shown in the drawings as solid or dashed arrows 22, discharged from and returned to the refrigeration unit 14 for maintaining a constant temperature for goods 24, shown stored on pallets 26 on the floors of the two trailers. Also, the refrigeration unit 14 is designed to have sufficient airflow capacity for heating and cooling both the lead trailer and the pup trailer.

In this drawing, a portion of the sides at the front and rear of the lead trailer 10 and a portion of the sides of the front and rear of the pup trailer 12 has been cutaway to show the goods 24 stored therein and the airflow 22 circulated inside trailers 10 and 12.

Figure 5:
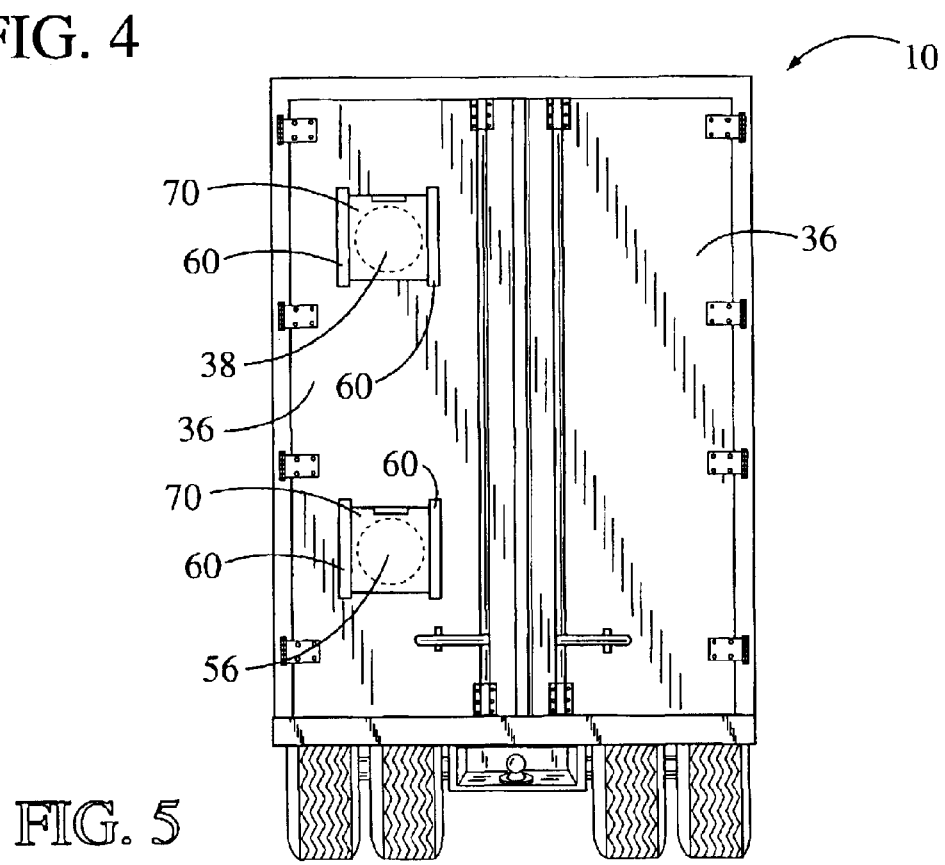
FIG. 5 is a rear view of the lead trailer with the rear doors closed. The ends of the transfer tube and the return tube have been removed. Cover plates are shown covering the transfer hole and the return hole when the airflow system is not in use.

The airflow system includes a modified air chute 28 having a first end 30 adapted for attaching to the air discharge opening 16 in the refrigeration unit 14. A second end 32 of the air chute 28 is releasably attached to a rear door air manifold 34. The air manifold 34 is mounted on an upper portion of one of the lead trailer's rear doors 36. The rear door manifold 34 is disposed around a lead airflow transfer hole 38 in the rear door 36. The transfer hole 38 is connected on one end of a hollow transfer tube 40. The rear door air manifold 34 acts as a funnel for gathering the airflow 22 from the air chute 28 and moving it through the transfer tube 40. The transfer hole 38 on the rear door 36 is lowered sufficiently so that the end of the transfer tube 40 can be reached and removed from the rear of the lead trailer 10 when the airflow system is not in use. This feature is shown in FIG. 5.

An opposite end of the transfer tube 40 is connected to a pup airflow intake hole 42. The intake hole 42 is hidden behind a mounting plate attached to the opposite end of the transfer tube 40. The pup airflow intake hole 42 is disposed in an upper portion of a front 44 of the pup trailer 12. The airflow 22, received from the lead trailer 10 via the air chute 28, the air manifold 34 and the transfer tube 40, is circulated along the length and the top of the pup trailer 12. At a rear 46 of the pup trailer 12, the airflow 22 engages the pup's rear door 48, where it is directed downwardly. The airflow 22 is then redirected back along the bottom and the floor of the pup trailer before returning through a pup airflow return hole 48. As the airflow 22 returns along the bottom and the floor of the pup trailer 12, it circulates in and around the goods 24 on the pallets 26 for maintaining a constant temperature inside the pup trailer. The pup airflow return hole 48 is in a lower portion of the front 44 of the pup trailer 12. The return hole 48 is connected on one end of a return tube 50. The transfer tube 40 and the return tube 50 are typically 12 inches in diameter for distributing the airflow 22 throughout the lead trailer 10 and the pup trailer 12. The pup airflow return hole 48 is hidden behind a mounting plate attached to the end of the return tube 50. The inside of the pup trailer 12 includes a bulkhead 52 having airflow openings 54 therein. The bulkhead 52 is used to prevent the goods 24 from sliding forward and blocking the return airflow through the pup airflow return hole 48. Also the bulkhead 52 with openings 54 is similar to the rear door air manifold 34 for helping funneling the return airflow 22 into the return tube 50 for heating or cooling the inside of the lead trailer 10.

A second end of the return tube 50 is connected to a lead airflow return hole 56. The lead airflow return hole 56 is in a lower portion of the lead trailer's rear door 36. The airflow 22 from the return tube 56 is discharged along the bottom and the floor of the lead trailer 10 before being drawn back in an air return opening 18 in the refrigeration unit 14. As the airflow 22 is circulated back along the bottom and the floor of the lead trailer 10, it flows around and beside the goods 24 stored on the pallets 26 for maintaining a constant temperature inside the trailer. The lead trailer 10 also includes a bulkhead 52 with openings 54 for helping funnel the airflow 22 into the air return opening 18. Further, the bulkhead 52 prevents the goods 24 from moving forward in the trailer and blocking the opening to the air return opening 18 in the refrigeration unit 14.

It should be noted from reviewing FIG. 1, the airflow 22 pattern travels in a counterclockwise direction from the refrigeration unit 14, through the air chute 28 along the length and top of the inside of the lead trailer 10, through the transfer tube 40, along the length and top of the pup trailer 12, back along the length and bottom of the pup trailer, through the return tube 50 and along the length and bottom of the lead trailer 10 before returning to the refrigeration unit 14 to be recirculated.

Figure 2:
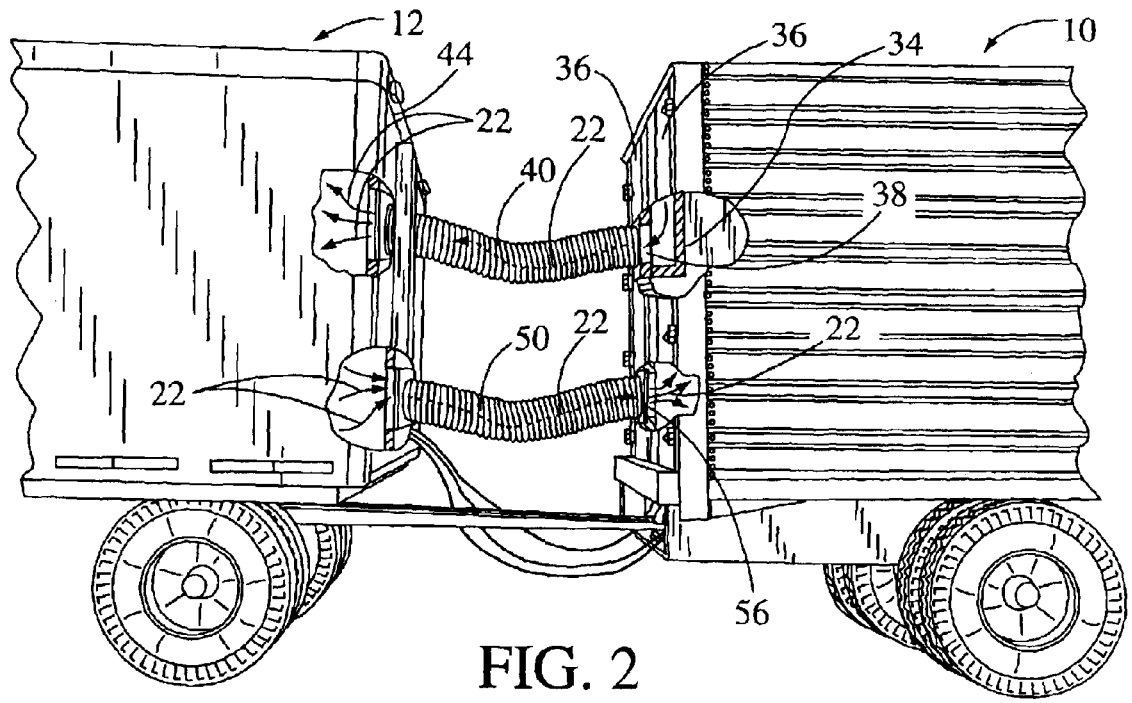
FIG. 2 is a perspective view of the rear of the lead trailer and the front of the pup trailer. Opposite ends of an airflow transfer tube and an airflow return tube are shown connected to the two trailers for circulating the airflow from the lead trailer to the pup trailer and back to the lead trailer.

In FIG. 2, a perspective view of the rear doors 36 of the lead trailer 10 and the front 44 of the pup trailer 12 is shown. In this drawing, a portion of the rear doors 36 of the lead trailer 10 and a portion of the air manifold 34 have been cutaway to illustrate the lead airflow transfer hole 38 and the lead airflow return hole 56 in the left rear door 36. Also, a portion of the front 44 of the pup trailer 12 has been cutaway to show the pup airflow intake hole 42 and the pup airflow return hole 48.

Figure 3:
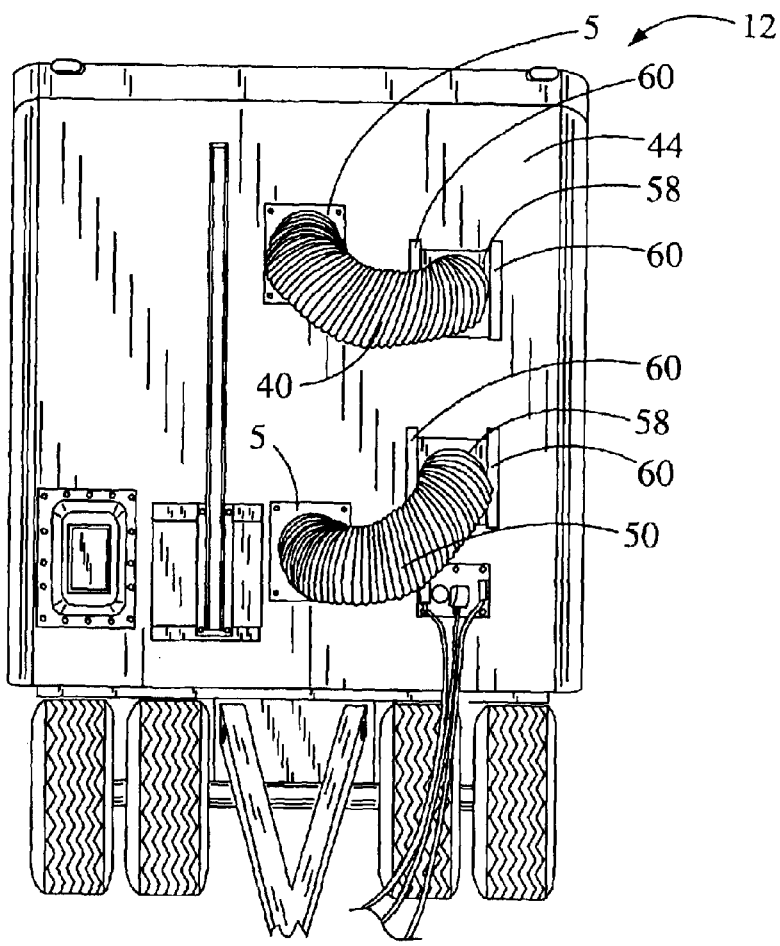
FIG. 3 is a front view of the front of the pup trailer. The ends of the transfer tube and the return tube are shown disconnected from the rear door of the lead trailer and in a stored position when the airflow system is not in use.

In FIG. 3, a front view of the front 44 of the pup trailer 12 is illustrated. In this drawing, the ends of the transfer tube 40 and the return tube 50 are shown attached to removable mounting plates 58. The removable mounting plates 58 are shown disconnected from the rear door 36 on the lead trailer 10 and in a stored position in mounting plate slides 60. The mounting plate slides 60 are attached to the front 44 of the pup trailer 12. Obviously, the tubes 40 and 50 are placed in this stored position on the pup trailer when the airflow system is not in use. Also, the opposite ends of the transfer tube 40 and the return tube 50 are attached to permanent mounting plates 59, which are permanently attached to the front 44 of the pup trailer as shown.

Figure 4:
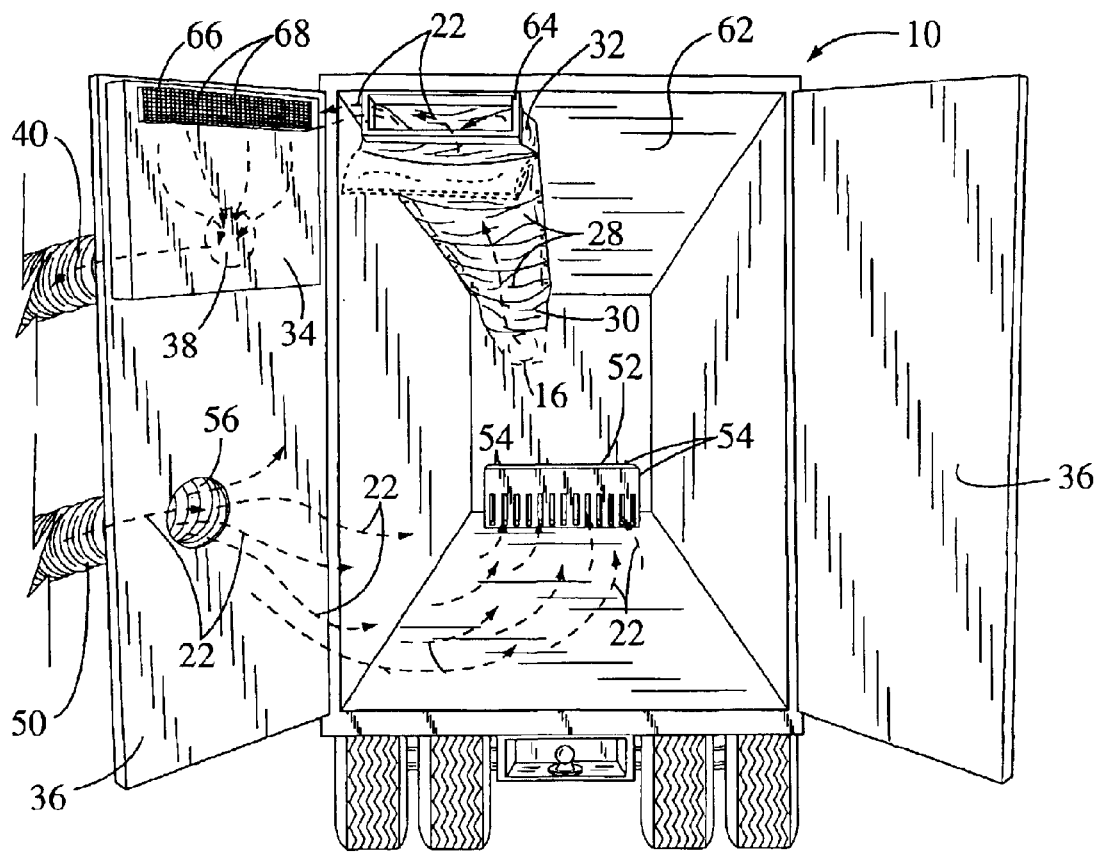
FIG. 4 is a rear view of the lead trailer with the rear doors open to illustrate a modified air chute having a first end connect to the air discharge opening in the refrigeration unit and a second end positioned for connecting to an intake of a rear door air manifold, when the doors are closed. One end of the transfer tube is shown connected to a lead airflow transfer hole in the rear door and one end of the return tube connected to a lead airflow return hole in the rear door.

In FIG. 4, a rear view of the lead trailer 10 is shown with the rear doors 36 opened to illustrate the modified air chute 28 attached to a portion of a ceiling 62 inside the trailer. The first end 30 of the air chute 28 is shown connect to the air discharge opening 16 in the refrigeration unit 14. The second end 32 of the air chute 28 is connected to an air chute frame 64. The air chute frame 64 releasably engages a manifold frame 66 with air screen 68. The manifold frame 66 and the air screen 68 cover an air intake of the rear door air manifold 34 when the trailer doors 36 are closed. In this drawing, a portion of the transfer tube 40 is shown connected to the lead airflow transfer hole 38 and one end of the return tube 50 is shown connected to the lead airflow return hole 56. Also, it should be noted that when the lead trailer 10 is not using the subject airflow system, a portion of the air chute 28 can be opened and lower, as shown in dashed lines, for circulating heated or cooled airflow from the refrigeration unit 14 inside the trailer 10.

In FIG. 5, a rear view of the lead trailer 10 is shown with the rear doors 36 closed. The ends of the transfer tube 40 with removable mounting plate 58 and the return tube 50 with removable mounting plate 58 have been removed from slides 60. The slides 60 are disposed on opposite sides of the lead airflow transfer hole 38 and the lead airflow return hole 56. The two holes 38 and 56 are shown in dashed lines. Removable hole cover plates 70 with handles are shown covering the transfer hole 38 and the return hole 56. The hole cover plates 70 are used when the airflow system is not in use. When the airflow system is in use, the hole cover plates are stored on the plate slides 60 on the front 44 of the pup trailer 12, as shown in FIG. 3.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which an exclusive privilege and property right are claimed and defined as follows:

1. An airflow system adapted for receiving airflow from a refrigeration unit mounted on a front of a lead trailer, the airflow system also adapted for transferring and receiving airflow from a pup trailer pulled behind the lead trailer, the airflow system uses heated or cooled airflow discharged from the refrigeration unit inside the lead trailer to either heat or cool goods at a constant temperature, the goods stored inside the lead trailer and the pup trailer, the airflow system comprising:
    a modified air chute having a first end adapted for attaching to an air discharge opening in the refrigeration unit, said air chute having a second end connected to a lead airflow transfer hole in a rear door of the lead trailer;
    a transfer tube, one end of said transfer tube connected to said lead airflow transfer hole, an opposite end of said transfer tube connected to a pup airflow intake hole in the front of the pup trailer, said transfer tube for transferring airflow from the lead trailer to the pup trailer and circulating the airflow therethrough; and
    a return tube, one end of said return tube connected to a pup airflow return hole in the front of the pup trailer, an opposite end of said return tube connected to a lead airflow return hole in the lead trailer's rear door, said return tube returning airflow from the pup trailer to the lead trailer for circulating the airflow through the lead trailer and recirculating the airflow back to the refrigeration unit.

2. The airflow system as described in claim 1 further including a rear door air manifold, said rear door air manifold adapted for mounting on an upper portion of the lead trailer's rear door, said rear door manifold connected to the second end of said modified air chute and disposed around said lead airflow transfer hole.

3. The airflow system as described in claim 1 wherein said lead airflow transfer hole in disposed in an upper portion of the lead trailer's rear door.

4. The airflow system as described in claim 1 wherein said lead airflow return hole is disposed in a lower portion of the lead trailer's rear door.

5. The airflow system as described in claim 1 wherein said pup airflow intake hole is in an upper portion of the front of the pup trailer.

6. The airflow system as described in claim 1 wherein said pup airflow return hole is in a lower portion of the front of the pup trailer.

7. The airflow system as described in claim 1 further including a first bulkhead with openings disposed inside the pup trailer and next to said pup airflow return hole, said first bulkhead preventing the restriction of airflow to said pup airflow return hole.

8. The airflow system as described in claim 1 further including a second bulkhead with openings disposed inside the lead trailer and next to an air return opening in the refrigeration unit, said second bulkhead preventing the restriction of recirculated airflow to the refrigeration unit.

9. An airflow system adapted for receiving airflow from a refrigeration unit mounted on a front of a lead trailer, the airflow system also adapted for transferring and receiving airflow from a pup trailer pulled behind the lead trailer, the airflow system uses heated or cooled airflow discharged from the refrigeration unit inside the lead trailer to either heat or cool goods at a constant temperature, the goods stored inside the lead trailer and the pup trailer, the airflow system comprising:
    a modified air chute having a first end adapted for attaching to an air discharge opening in the refrigeration unit, said air chute having a second end attached to a rear door air manifold, said air manifold adapted for mounting on an upper portion of a rear door of the lead trailer, said rear door manifold connected to a lead airflow transfer hole in the rear door;
    a transfer tube, one end of said transfer tube connected to said lead airflow transfer hole, an opposite end of said transfer tube connected to a pup airflow intake hole in the front of the pup trailer, said intake hole is in an upper portion of the front of the pup trailer, said transfer tube for transferring airflow from the lead trailer to the pup trailer and circulating the airflow therethrough; and
    a return tube, one end of said return tube connected to a pup airflow return hole in a lower portion of the front of the pup trailer, an opposite end of said return tube connected to a lead airflow return hole in a lower portion of the lead trailer's rear door, said return tube returning airflow from the pup trailer to the lead trailer for circulating the airflow through the lead trailer and recirculating the airflow back to the refrigeration unit.

10. The airflow system as described in claim 9 further including a first bulkhead with openings therein and disposed inside the pup trailer and next to said pup airflow return hole, said first bulkhead with openings preventing the restriction of airflow to said pup airflow return hole by the goods stored in the pup trailer.

11. The airflow system as described in claim 9 further including a second bulkhead with openings therein and disposed inside the lead trailer and next to an air return opening in the refrigeration unit, said second bulkhead preventing the restriction of recirculated airflow to the refrigeration unit by the goods stored in the lead trailer.

12. A method for heating and cooling a lead trailer and a pup trailer pulled behind the lead trailer using heated or cooled airflow discharged from a refrigeration unit, the refrigeration unit mounted on the front of the lead trailer, the airflow maintaining goods stored inside the lead trailer and pup trailer at a constant temperature, the steps comprising:

conveying the airflow from the refrigeration unit through an air chute to a rear of the lead trailer;

transferring the airflow from the air chute through a lead airflow transfer hole in a read door of the lead trailer and to a transfer tube;

conducting the airflow through the transfer tube and through a pup airflow intake hole in a front of the pup trailer;

circulating the airflow through the pup trailer and back through a pup airflow return hole in the front of the pup trailer;

conducting the return airflow through the pup airflow return hole to a return tube;

returning the return airflow through the return tube and through a lead airflow return hole in the rear door of the lead trailer; and circulating the return airflow through the lead trailer and recirculating the airflow back to the refrigeration unit.

13. The method as described in claim 12 further including the step of transferring the airflow from the chute through a rear door air manifold mounted on an upper portion of the rear door, the rear door air manifold in turn transferring the airflow through the lead airflow transfer tube.

14. The method as described in claim 12 further including the step of circulating the airflow in the pup trailer through holes in a first bulkhead in the pup trailer prior to conducting the airflow through the pup airflow return hole.

15. The method as described in claim 12 further including the step of circulating the return airflow through holes in a second bulkhead in the lead trailer prior to recirculating the airflow back to the refrigeration unit.

* * * * *